United States Patent [19]

Kakizaki et al.

[11] Patent Number: 5,357,424
[45] Date of Patent: Oct. 18, 1994

[54] DYNAMIC MODEL PARAMETER IDENTIFICATION SYSTEM

[75] Inventors: Takao Kakizaki, Kodaira; Koji Otani, Tokyo; Kenji Kogure, Kokubunji, all of Japan

[73] Assignee: Nippon Telegraph and Telephone Corporation, Tokyo, Japan

[21] Appl. No.: 39,997

[22] Filed: Mar. 30, 1993

[30] Foreign Application Priority Data

Mar. 31, 1992 [JP] Japan .................................. 4-077901

[51] Int. Cl.$^5$ .............................................. G06F 15/46
[52] U.S. Cl. .............................. 364/149; 364/167.01; 395/89; 395/96; 901/2
[58] Field of Search .............................. 364/148–151, 364/158, 159, 167.01; 395/80, 85, 87, 89, 96, 97, 86; 901/2, 15, 19; 318/568.11, 568.19, 568.22

[56] References Cited

U.S. PATENT DOCUMENTS

| | | | |
|---|---|---|---|
| 4,698,572 | 10/1987 | Stone | 395/89 |
| 4,763,276 | 8/1988 | Perreirra | 395/89 |
| 4,925,312 | 5/1990 | Onaga et al. | 395/96 |
| 5,049,796 | 9/1991 | Seraji | 395/96 |

OTHER PUBLICATIONS

The American Society of Mechanical Engineers, DSC-vol. 42, Advances in Robotics, Book No. G00751-1992, pp. 193-200, 'Experimental Investigation on the Accurate Dynamic Parameter Identification of an Industrial Robotic Manipulator', Takao Kakizaki, et al.
Proceedings of the 1992 IEEE/RSJ International Conference on Intelligent Robots and Systems, Jul. 7–10, 1992, 0-7803-0737-2/92, pp. 990–997, Koji Otani, et al., 'Dynamic Parameter Identification of an Industrial Robot and Its Application to Trajectory Controls.'

*Primary Examiner*—Stephen M. Baker
*Assistant Examiner*—Steven R. Garland
*Attorney, Agent, or Firm*—Finnegan, Henderson, Farabow, Garrett & Dunner

[57] ABSTRACT

The present invention provides a dynamic model parameter identification system consisting of a parameter classifying part and a motion planning part. The parameter classifying part approximates the respective links forming the manipulator by means of a symmetrical and homogeneous virtual solid link, calculates the inertial parameters, and finally classifies the calculated inertial parameters into parameter groups. The motion planning part calculates the condition number for the parameter coefficient sub-matrix, and calculates the number of equilibriums which is shown by the quotient of the maximum and minimum values of the vector normal of the rows of the coefficient sub-matrix. The motion planning section then sets the motion for parameter identification so that the condition number and number of equilibriums are both below predetermined values. Therefore, it is possible to identify the dynamic parameters of a robotic manipulator with a high degree of accuracy and without carrying out numerous trial-and-error experiments.

8 Claims, 8 Drawing Sheets

FIG. 4 (1)
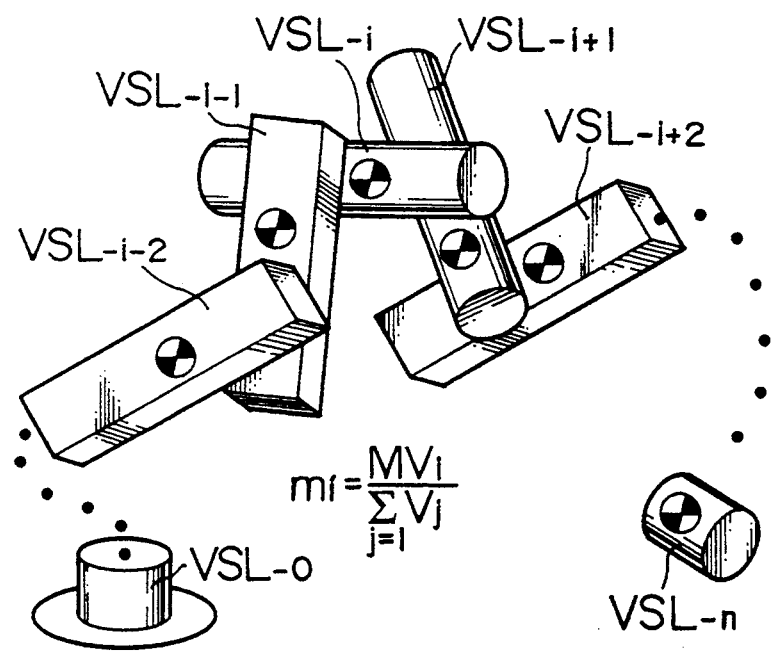
$$mf = \frac{MV_i}{\sum_{j=1}^{n} V_j}$$
FIG. 4 (2)
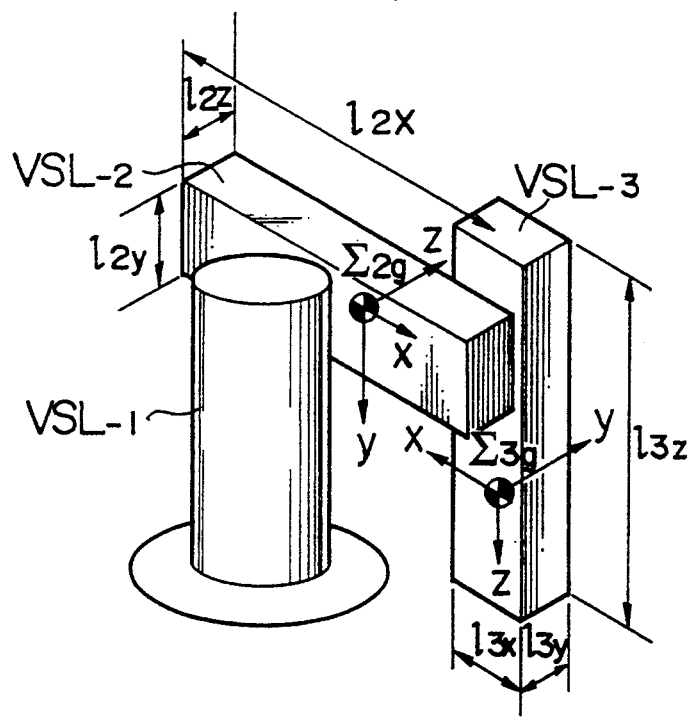

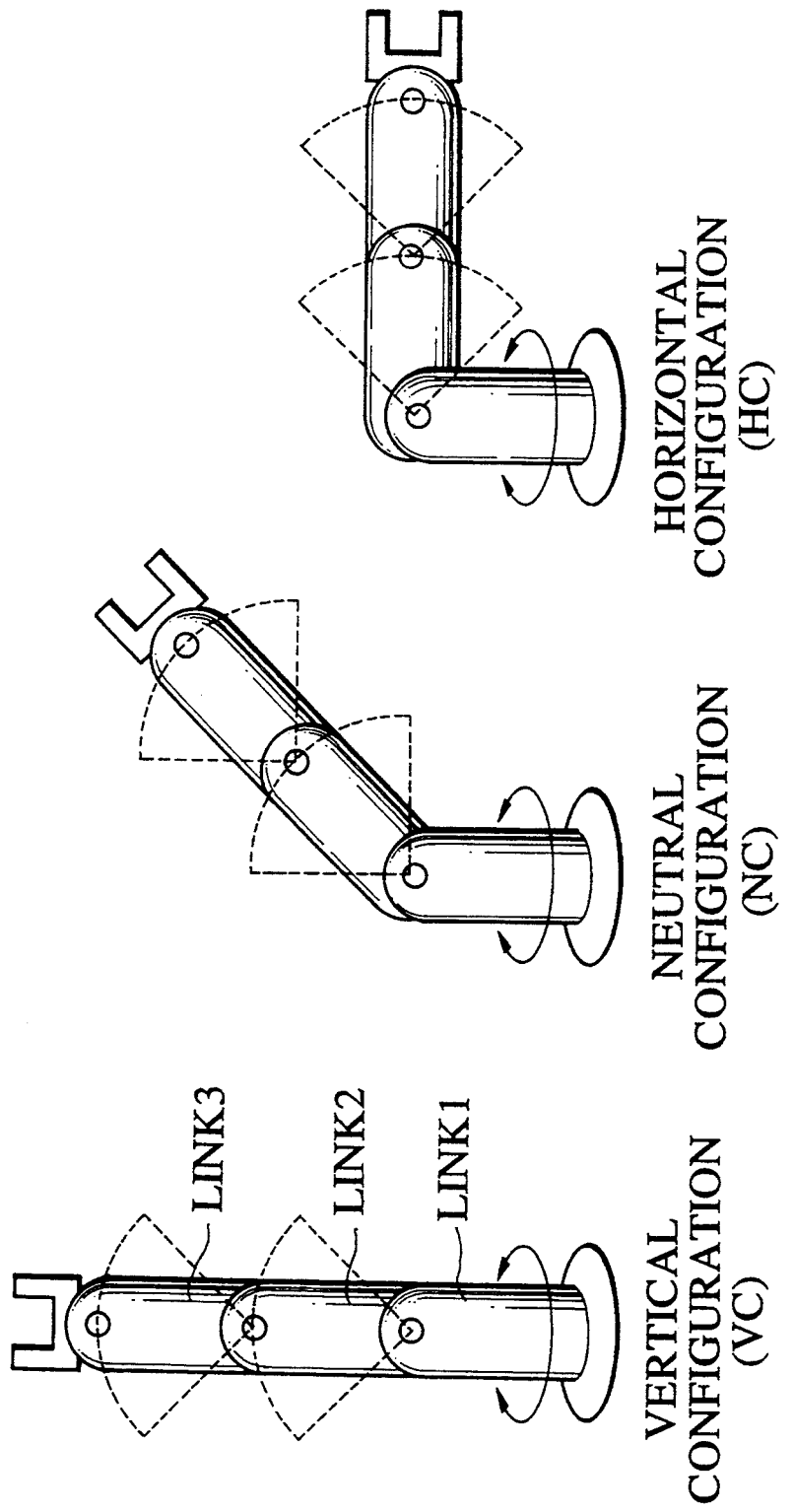

FIG. 6

| | $\theta_1$ (deg) | $\theta_2$ (deg) | $\theta_3$ (deg) | $\dot{\theta}_1$ max (deg/sec) |
|---|---|---|---|---|
| VC | 0 ~ 40 | -115 ~ -65 | -120 ~ -60 | 50 ~ 250 |
| NC | | -70 ~ -20 | | |
| HC | | -25 ~ 25 | | |

FIG. 7

| i | $\theta_{io}$ (radian) | $\omega_i$ (radian/sec) |
|---|---|---|
| 1 | 0.35 | 2.49 ~ 12.46 |
| 2 | 0.44 | 1.98 ~ 9.9 |
| 3 | 0.52 | 1.67 ~ 8.38 |

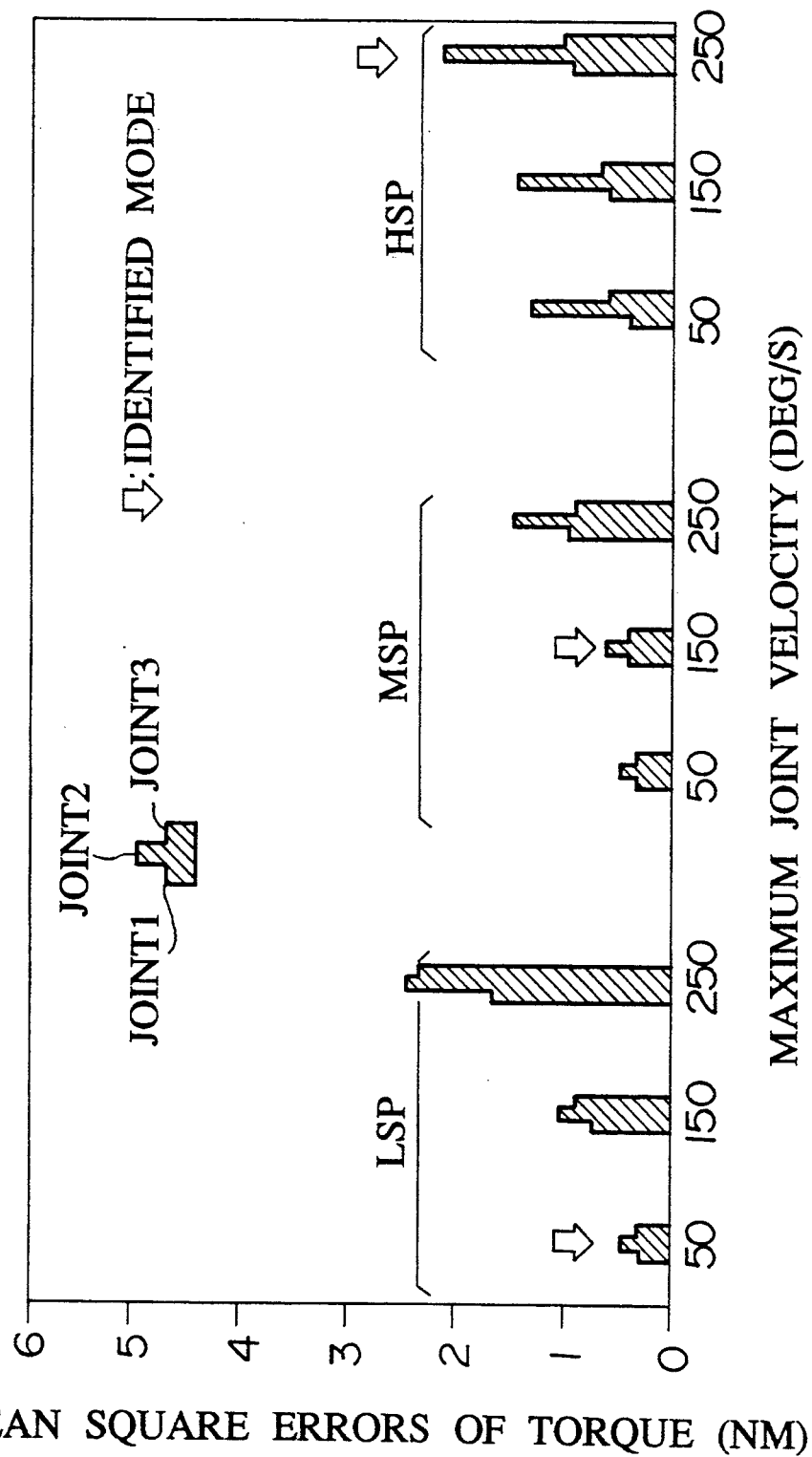

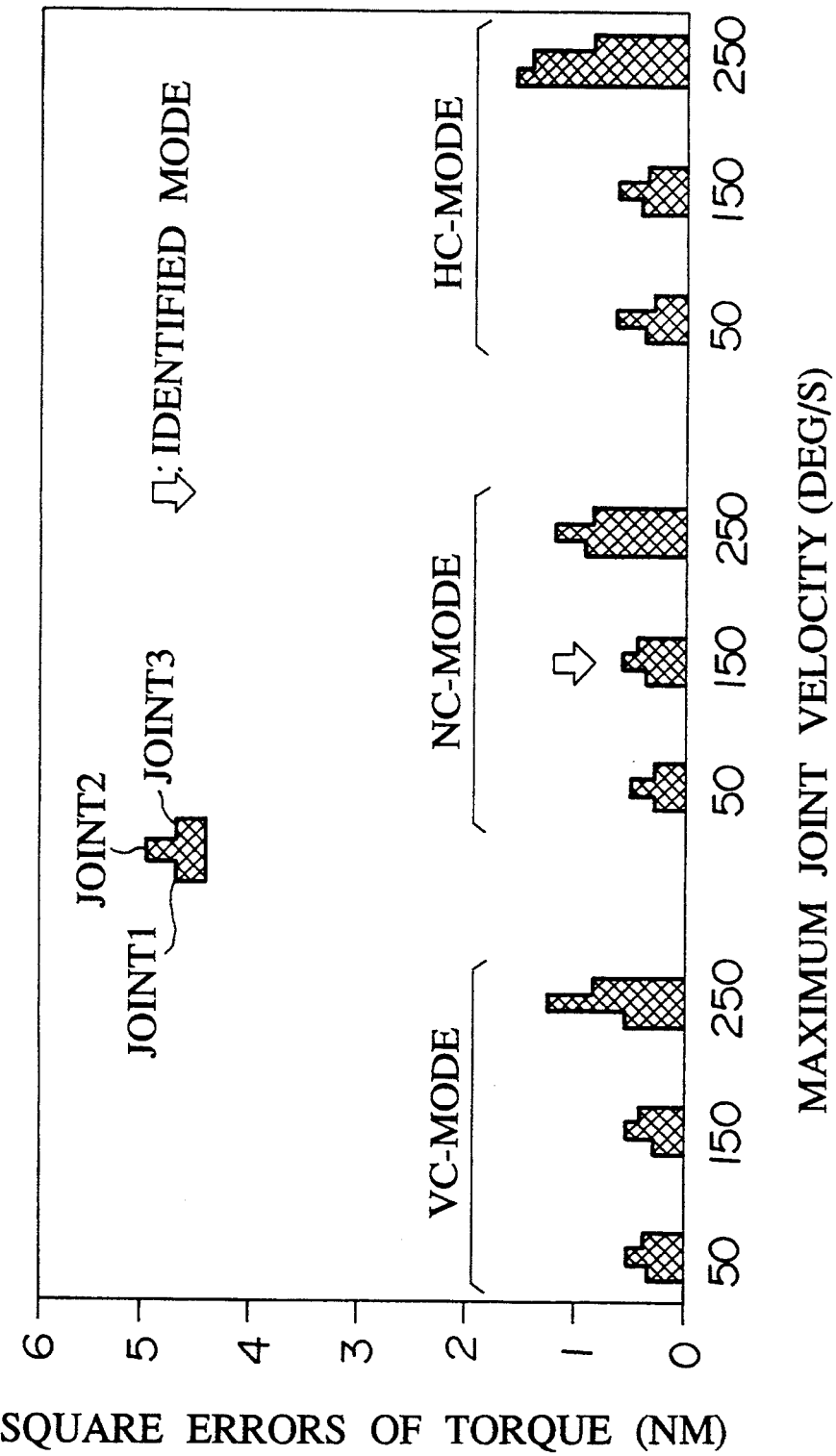

DYNAMIC MODEL PARAMETER IDENTIFICATION SYSTEM

BACKGROUND OF THE INVENTION

1. Field of the Invention

The present invention relates to a dynamic model parameter identification system for accurately estimating dynamic models required in dynamic control introduced in order to operate a robotic manipulator accurately and at high speed.

2. Background Art

As a result of developments in robotic technology, robotic manipulators have recently been used not only for spot welding and for inserting simple parts in assembly operations, but also for such tasks as arc welding, painting, and sealing-jobs that require high speed and high accuracy. Therefore, higher and more precise performance from robotic manipulators is desirable in order to increase the productivity of these operations. For this reason, it will be necessary to actively compensate the effect of nonlinear dynamics which can be significant in the high speed, high accuracy motion of robotic manipulators of the high reduction ratio type. However, it is not possible to sufficiently satisfy this demand with conventional methods wherein in, for example, independent proportional derivative control system is employed for each joint. With the objective of resolving this problem, there have been proposed a variety of dynamic control methods, the computed torque method being one representative of these. The principal task of these dynamic controls is to calculate the joint torques necessary for the control of given trajectories and at given speeds. Accordingly, when moving a robotic manipulator along a trajectory generated in real time using sensors or the like, it is necessary to carry out these calculations in real time at a high speed, and the sampling time required would be 15 times the eigen-frequency of the manipulator mechanism. With the recent developments of high-speed processors like DSP and of newly developed parallel processing algorithms, however, high-speed computation for dynamic control has become possible.

Accurate dynamic models for robotic manipulators are necessary for carrying out dynamic control. More concretely, in addition to such geometric parameters as link length, dynamic parameters such as link mass, inertial tensor, and first-order moment must be identified. Although geometric parameters can be identified according to static position and orientation measurements of the robotic manipulator, it is not possible to identify dynamic parameters by static measurements, and is still difficult even when the robotic manipulators are designed using such sophisticated design tools as CAD systems. Moreover, there are few commercial robotic manipulators whose dynamic parameters are publicly available.

In order to resolve such problems as mentioned above, research regarding the identification of dynamic parameters has been widely carried out. From this research there has been proposed a sequential identification method wherein parameters are sequentially identified from a plurality of tests which are determined according to the structural configuration of the robotic manipulator under consideration. Further, it has been clarified that it is possible to derive a linear input-output equation relating to dynamic parameters from equations of motion for robotic manipulators of the revolving joint type. In this method, dynamic parameters are identified by measuring joint torques and joint angular position, velocity and acceleration, when all the joints are driven at the same time. However, the fundamental problem with these methods is that there are parameters that do not contribute to the joint torques and that there are redundant parameters that only contribute as linear combinations with other parameters. For this reason the concept of base parameters as non redundant parameters was proposed, and research was carried out on the base parameters of serial link type robotic manipulators and base parameters of closed link type robotic manipulators. From this research, a procedure was proposed which used a covariance matrix of nonlinearity to derive the principal base parameters contributing predominantly to the joint torques.

With regard to the principal base parameters of serial link type and closed link type robotic manipulators, the history of theoretical study is still relatively new, and sufficient experimentation has not yet been carried out. Moreover, although there are some experimental studies that have been done using simple direct-drive manipulators with little friction, there are few studies of the highly geared manipulators widely used in industries. In these studies, the sequential identification method was applied to the basic three degrees of freedom of an industrial manipulator with DC motors and harmonic drive mechanisms implemented in its joints, and it was shown that the viscosity friction coefficient and Coulomb's friction coefficient are not reliant on the orientation of the robotic manipulator but are almost constant in the tested cases. Other experimental studies have been performed on the Puma 760. These concluded that the controlling parameters for torque were the Coulomb friction terms and the diagonal terms of the inertial matrix, and that, because of the large size of the manipulator, it was difficult to excite the inertial dependent parameters and, as a result, these parameters could not be separated from the gravitational parameters. The studies described so far have used the sequential identification method for which the test procedure is complicated but for which the identification operation is easily arranged. Moreover, when the sequential identification method is employed, it has also been pointed out that errors easily accumulate. In contrast, there are few corroborative reports for the simultaneous identification method, which is a superior method with respect to the fact that the necessary parameters can be simultaneously inferred. In particular, with regard to the simultaneous identification method, the preferable operation for accurate identification is not clear, and in a manipulator with multiple degrees of freedom, the number of dynamic model parameters inevitably increases and, thus, the identification becomes even more difficult. For this reason, in spite of the appearance of such high speed processors as DSP, the application of dynamic control to industrial robotic manipulators is still a difficult matter.

In the conventional art, because there is not means for intrinsically selecting the parameters which have a controlling effect on the control capacity, great labor cost is required to identify the parameters. Further, in the conventional art a means for easily providing the preferable operation for parameter identification is not provided, therefore the highly accurate identification of parameters is difficult.

SUMMARY OF THE INVENTION

The present invention was conceived in light of the aforementioned situation, and has as its objective the provision of a high capability dynamic model parameter identification system which resolves the problems encountered in the prior art in which considerable labor is used in the identification of all the parameters because there is no means for electing the parameters which have a predominant effect on the control capacity, and in which the highly accurate identification of parameters is difficult because there is no means provided for deciding the preferable operation for parameter identification.

The present invention provides a dynamic model parameter identification system comprising a parameter classifying part and a motion planning part. The parameter classifying part a) approximates each respective links forming the manipulator by means of a symmetrical and homogeneous virtual solid link for which the non-diagonal terms of the inertial tensor matrix are trivial, b) calculates the inertial parameters relating to the joint torque calculations of the manipulator based on the inertial tensor matrix components of the virtual solid link and on link parameter information which indicates the relative relationship between position and orientation of the respective links, and c) finally classifies the calculated inertial parameters into parameter groups. The motion planning part a) calculates the condition number for the parameter coefficient sub-matrix which is formed by the terms of the matrix corresponding to the parameters under consideration, and b) calculates the number of equilibriums which is shown by the quotient of the maximum and minimum values of the vector normal of the rows of the coefficient sub-matrix. The motion planning section then determines the motion for parameter identification so that the condition number and number of equilibriums are both below predetermined values. As a result of the above, the following effects are obtained.

The present invention is chiefly characterized in having the ability to accurately identify dynamic model parameters for a robotic manipulator without going through numerous trial-and-error testings. The present invention differs from the conventional art in that it is provided with a means for extracting the dominant dynamic parameters based on simple geometric models, and a means for determining the identifying motion for improving the measurement accuracy from the properties of the parameter coefficient matrix.

In the present invention, the concept of virtual solid link is introduced, and a method of easily indexing the dominant dynamic parameters which substantially contribute to the joint torque is offered. Further, due to the provision of a motion planning means for obtaining the dominant dynamic parameters with a high degree of accuracy, a highly effective motion planning method is offered which does not rely on trial-and-error testing as is the case in the conventional art.

The high capability dynamic model parameter identification system of the present invention resolves the above-stated problems of conventional methods, and can be widely employed in the robotics industry for such tasks as painting, high speed welding, sealing or the like.

BRIEF DESCRIPTION OF THE DRAWINGS

FIG. 4 (1) and FIG. 4 (2) are diagrams showing VSL.

FIG. 5 is a diagram showing the configuration for identification.

FIG. 6 is a diagram showing the joint motion conditions.

FIG. 7 is a diagram showing the joint amplitude and frequency.

FIG. 9 is a diagram showing the error in computed torque.

FIG. 10 is a diagram showing the error in computed torque.

DETAILED DESCRIPTION OF THE PREFERRED EMBODIMENTS

An explanation of the present invention based on preferred embodiments follows below.

Figure 1:
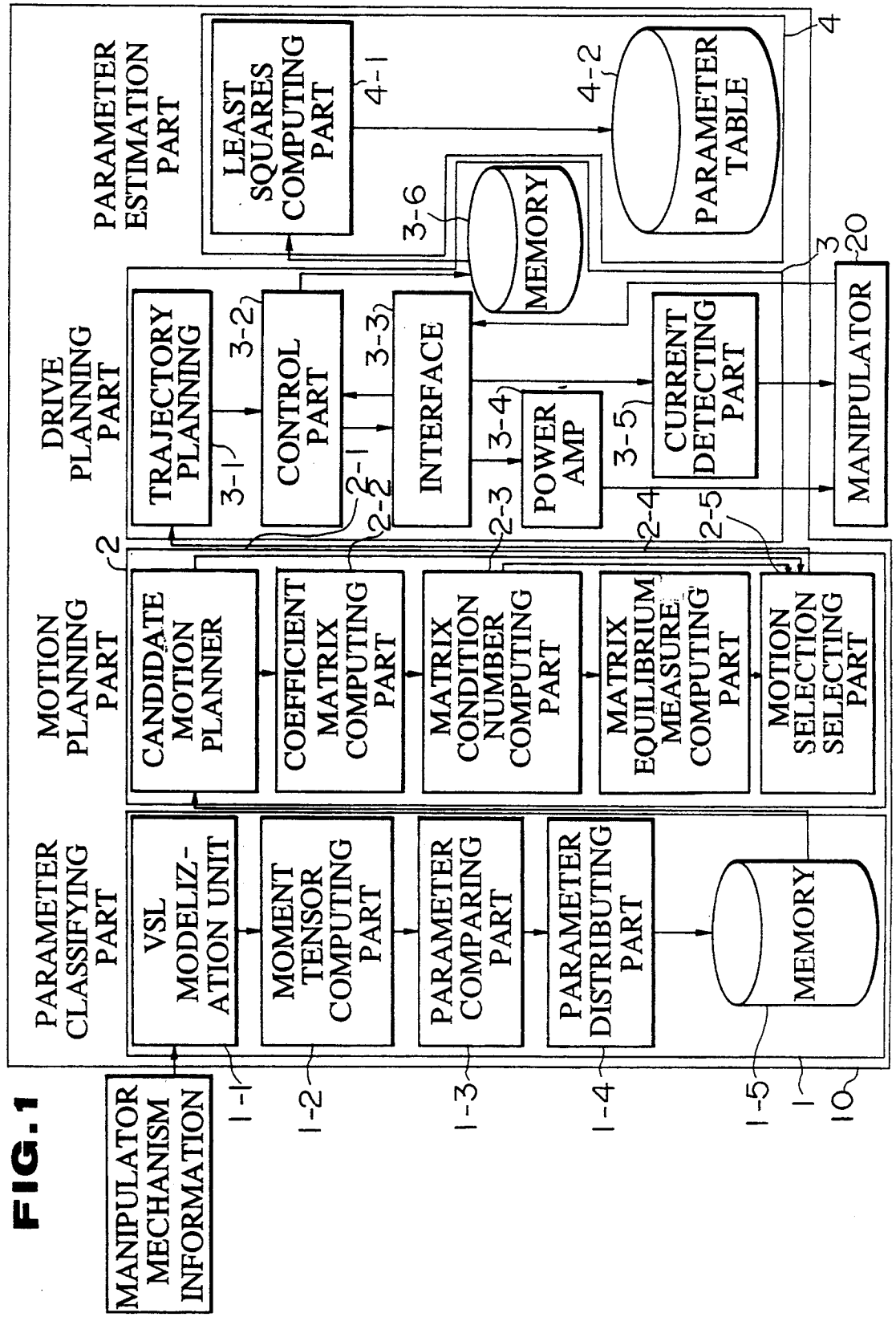
FIG. 1 is a diagram showing the structure of the first embodiment of the present invention.

FIG. 1 is a diagram showing the first embodiment of the present invention which comprises the parameter classifying part 1; the motion planning part 2; the drive planning part 3; and the parameter estimation part 4.

An outline of the dynamic parameter identification method based on the linear identification theory, which is the foundation of the present invention, will now be offered starting first with a detailed explanation of the motion of the device shown in FIG. 1.

Figure 2:
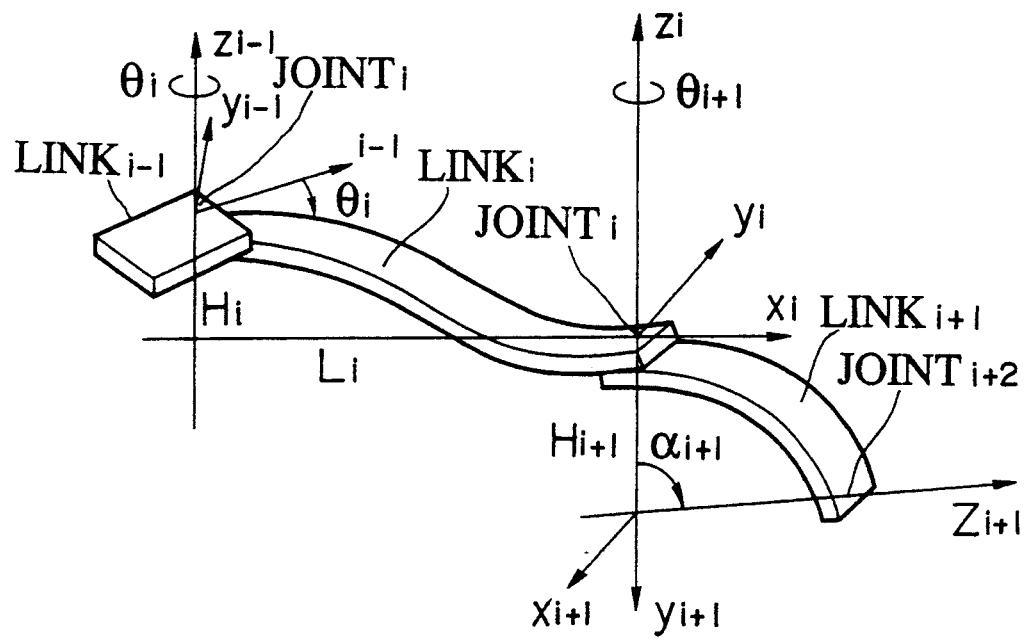
FIG. 2 is a diagram showing the link coordinates and geometric parameters of the robotic manipulator.

The coordinate and geometric parameters which are set for the manipulator links are shown in FIG. 2. Here the manipulator shall be taken to be one which has an open link structure and revolving joints. Reference to joints and coordinates shall be in accordance with the Paul method. The link numbers from the base of the arm to the tip thereof shall be numbered 0, 1, ... n, and the connecting portion between link-i-1 and link-i shall be referred to as joint-i. For link-i, a coordinate system (hereinafter referred to as $\Sigma_i$) according to the Denavit-Hartenberg method shall be established. The torque in joint-i for driving link-i is called $t_i$. When geometrical link parameters of the robotic manipulator and such inertial parameters as the link mass and inertial tensor are used, the motion parameter $x^i$ related to the torque $t_i$ is shown by the following formula.

$$x^i = ({}^i\Phi_i \beta_i {}_i f_i) \quad (1)$$

where, ${}^i\Phi_i$: first order moment about $\Sigma_{i\text{-}1}$ $\beta_i$: inertial tensor about $\Sigma_{i\text{-}1}$ $c_i$: viscose friction coefficient of joint-i (usually identical to coordinates $\Sigma_{i\text{-}1}$)

$f_i$: Coulomb friction coefficient of joint 1 $\quad (2)$

Further, the first order moment ${}^if_i$, and the inertial tensor $b_i$ are shown as follows below.

$${}^i\Phi_i = m_i({}^ia_i + {}^is_i) + \gamma_{i+1}{}^ia_i. \quad (3)$$

$$\beta_i = ({}^i\underline{I}_{11}\ {}^i\underline{I}_{22}\ {}^i\underline{I}_{33}\ {}^i\underline{I}_{12}\ {}^i\underline{I}_{13}\ {}^i\underline{I}_{23}) \quad (4)$$

where, $m_i$: mass of link-i $^i a_i = (a_{ix}, a_{iy}, a_{iz})^T$: the position vector from the origin of $\Sigma_{i-1}$ to the origin of $\Sigma_i$.

$^i S_i = (S_{ix}, S_{iy}, S_{iz})^T$: the position vector from the origin of $\Sigma_i$ to the mass center of the link-i.

$$\gamma_i = \sum_{j=i}^{n} m_j \quad (4)$$

total mass of the virtual links which contribute to the motion of virtual link-i $$^i\underline{I}_i \; [^i\underline{I}_{jk}] = {}^iI_i + m_i\{(^ia_i + {}^is_i)^T({}^ia_i + {}^is_i)E_3 - (^ia_i + {}^is_i)(^ia_i + {}^is_i)^T\} + \gamma_{i+1}({}^ia_i^T {}^ia_i E_3 - {}^ia_i{}^ia_i^T)$$

$^iI_i$: inertial tensor about the mass center of link-i shown by $\Sigma_i$ $E_3$: 3×3 unit matrix (5)

The motion parameters from link 1 through link n can be represented in a matrix form using motion parameters $x^i$ of each link by the following formula.

$$\chi = [x^1, x^2, \ldots x^n]^t \quad (6)$$

The relationship between $\chi$ and all the torque vectors t at this time is obtained by the following formula.

$$\tau = W\chi \quad (7)$$

Here, W is referred to as the motion data matrix or the parameter coefficient matrix. In this way, the motion parameters linearly contribute to the joint torques. Matrix W is calculated from the link geometric parameters and the motion data $\Theta_i$, $\dot{\Theta}_i$ and $\ddot{\Theta}_i$. In contrast, the joint torque $\tau$ is obtained from the input of the actuator. Accordingly, if all of the joints of the robotic manipulator are simultaneously driven and, the linear identification theory is applied to this result, it becomes possible to identify the motion parameters of the manipulator.

The preferred embodiments of the present invention will now be explained in greater detail using a robotic manipulator as an example.

Figure 3:
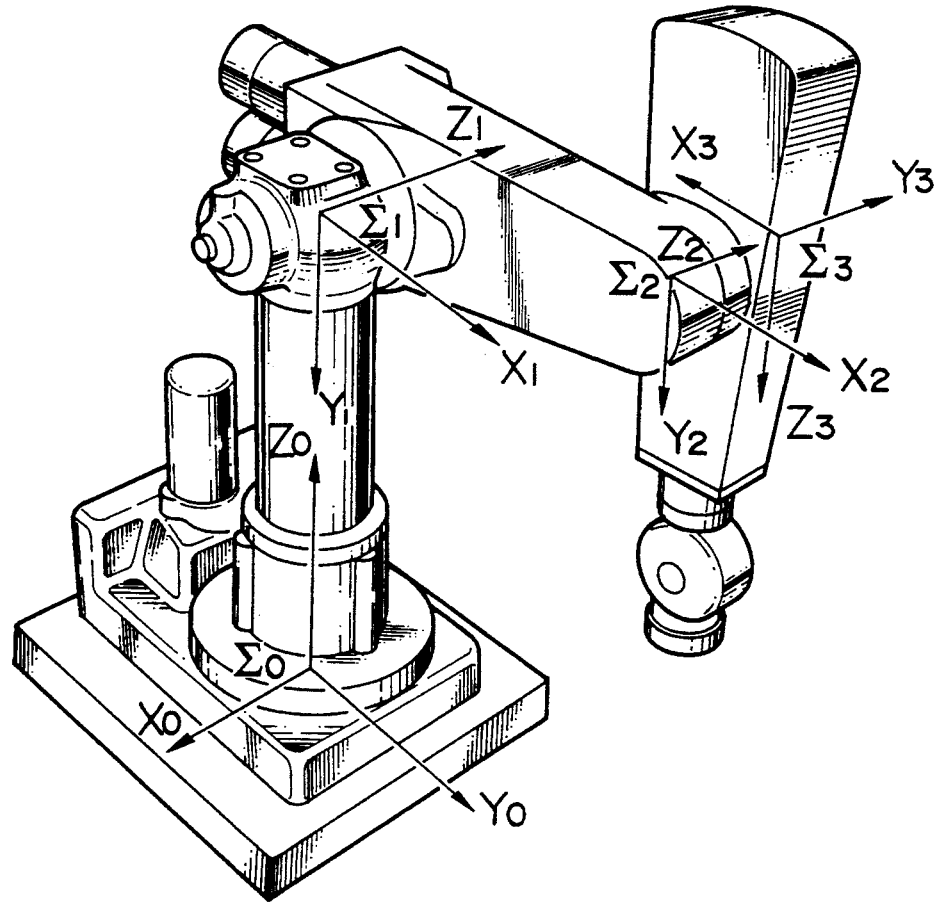
FIG. 3 is a diagram showing the link structure and link coordinates of an industrial robotic manipulator.

For this purpose, the link structure and link coordinate system of an industrial robotic manipulator (Puma 260) are shown in FIG. 3. The parameters to be identified here are the three fundamental degrees of freedom in a robotic manipulator, upon which dynamic effects are substantial. Links 4, 5 and 6 located at the distal end of the arm were modelized in the analysis simply as an added mass attached to link 3. Additionally, the dynamic parameters to be identified were limited to the friction parameters and the base parameters.

Parameter classifying part 1 will first be explained.

As may be clearly seen from FIG. 3, link-2 and link-3 of the manipulator are nearly symmetrical structures. To model of these symmetrical links, we introduce a Virtual Solid Link (VSL) model with a completely symmetrical block structure, such as is shown in FIG. 4. Here, link-i is the link parameter of the model VSL-i, and the link coordinate frames and corresponding joint are the same as link-i. The preparation of VSL is carried out in a VSL modelization unit 1—1. When the center of VSL-i mass, $\Sigma_{ig}$, is on the principal axis of inertia, the inertial tensor about $\Sigma_{ig}$ for VSL-i is given as follows:

$$^iI_g = \begin{bmatrix} \alpha_i \underline{m}_i(l_{iy}^2 + l_{iz}^2) & {}^i\epsilon_{12} & {}^i\epsilon_{13} \\ {}^i\epsilon_{21} & \alpha_i \underline{m}_i(l_{iz}^2 + l_{ix}^2) & {}^i\epsilon_{23} \\ {}^i\epsilon_{31} & {}^i\epsilon_{32} & \alpha_i \underline{m}_i(l_{ix}^2 + l_{iy}^2) \end{bmatrix} \quad (8)$$

$\underline{m}_i$ is the mass of VSL-i, and may be expressed by the following formula.

$$\underline{m}_i = MV_i / \sum_{j=1}^{n} V_j \quad (9)$$

where

M: total mass of the manipulator $V_i$: volume of VSL-i $\alpha_1 = 1/12$

From the nature of the VSL, non-diagonal elements $^i\epsilon_{ik}$ can be regarded as zero. Furthermore, from the parallel axis theorem, the inertial tensor $^iI_i$ of VSL-i about $\Sigma_i$ is given as $$^i\underline{I}_i = {}^i\underline{I}_g + \underline{m}_i({}^is_i^T {}^is_i E_3 - {}^is_i{}^is_i^T) \quad (10)$$

Thus, from Eqs. (3) and (5), the 1st-order moment and the inertial tensor around $\Sigma_{i-1}$, which relates to the computed torque of joint-i, are given as follows:

$$^i\underline{\phi}_1 = \underline{m}_i(a_{ix} + s_{ix}) + \underline{\gamma}_i a_{ix} \quad (11)$$

$$^i\underline{\phi}_2 = \underline{m}_i(a_{iy} + s_{iy}) + \underline{\gamma}_i a_{iy}$$

$$^i\underline{\phi}_3 = \underline{m}_i(a_{iz} + s_{iz}) + \underline{\gamma}_i a_{iz}$$

$$^i\underline{I}_{11} = \alpha_i \underline{m}_i(l_{iy}^2 + l_{iz}^2) + \underline{m}_i(s_{iy}^2 + s_{iz}^2) + \underline{m}_i\{(a_{iy} + s_{iy})^2 + (a_{iz} + s_{iz})^2\} + \underline{\gamma}_i(a_{iy}^2 + a_{iz}^2) \quad (12)$$

$$^i\underline{I}_{22} = \alpha_i \underline{m}_i(l_{iz}^2 + l_{ix}^2) + \underline{m}_i(s_{iz}^2 + s_{ix}^2) + \underline{m}_i\{(a_{iz} + s_{iz})^2 + (a_{iy} + s_{iy})^2\} + \underline{\gamma}_i(a_{ix}^2 + a_{ix}^2)$$

$$^i\underline{I}_{33} = \alpha_i \underline{m}_i(l_{ix}^2 + l_{iy}^2) + \underline{m}_i(s_{ix}^2 + s_{iy}^2) + \underline{m}_i\{(a_{ix} + s_{ix})^2 + (a_{iy} + s_{iy})^2\} + \underline{\gamma}_i(a_{ix}^2 + a_{iy}^2)$$

$$^i\underline{I}_{12} = {}^i\epsilon_{12} - \underline{m}_i s_{ix} s_{iy} - \underline{m}_i(a_{ix} + s_{ix})(a_{iy} + s_{iy}) - \underline{\gamma}_i a_{ix} a_{iy}$$

$$^i\underline{I}_{23} = {}^i\epsilon_{23} - \underline{m}_i s_{iy} s_{iz} - \underline{m}_i(a_{iy} + s_{iy})(a_{iz} + s_{iz}) - \underline{\gamma}_i a_{iy} a_{iz}$$

$$^i\underline{I}_{31} = {}^i\epsilon_{31} - \underline{m}_i s_{iz} s_{ix} - \underline{m}_i(a_{iz} + s_{iz})(a_{ix} + s_{ix}) - \underline{\gamma}_i a_{iz} a_{ix}$$

For VSL-3, corresponding to link-3, $^3\Phi_2$ from the manipulator structure does not contribute to the joint torque, and the redundant parameters $^3I_{11}$ and $^3I_{33}$ contribute as one parameter given in the following form.

$$^3\underline{I}_{11} - {}^3\underline{I}_{33} = \alpha \underline{m}_3(l_{3z}^2 - l_{3x}^2) + 2\underline{m}_3 s_{3z}^2 \quad (13)$$

The above calculations are performed in moment tensor computing part 1-2. The computed results are sent to parameter comparing part 1-3, and the parameters are classified.

For example, from the configuration of the robotic manipulator, it is clear that $l_{3z} >> l_{3x}, l_{3y}$. Furthermore, from the structural symmetry of the robotic manipulator, it is obvious that: diagonal terms of the inertial tensor are much larger than the non-diagonal terms. The approximate values of $^3a_3$ and $^3s_3$ can be easily calculated from the link parameters, and the elements other than $a_{3y}, s_{3z}$ in $^3a_3$ and $^3s_3$ can be regarded as zero because the joint and mass center are both in each axis of symmetry in VSL-3.

Consequently, the absolute values of the first-order moment and inertial tensor parameters which contribute to the torque of joint-3 can be order estimated as below from Eqs. (8) and (9).

first-order moment $^3\Phi_3 >> {}^3\Phi_1 \approx 0$ inertial tensor $^3\underline{I}_{22} > {}^3\underline{I}_{11} - {}^3\underline{I}_{33}, {}^3\underline{I}_{23} >> {}^3\underline{I}_{12}, {}^3I_{31} \approx 0$ (14)

Based on the results, for the parameters of link-3, $^3\Phi_3$ and $^3I_{22}$ will be hereinafter called the dominant parameters, and $^3I_{11} - {}^3I_{33}$ and $^3I_{23}$ will be called as the subdominant parameters. Other parameters will be called trivial parameters.

The same VSL structure can be used for link-2; the first-order moment and inertial tensor parameters which contribute to the torque can therefore be order estimated as below. However, it should be noted that the relationship between the long and short axes of the link and the matrix be different in $\Sigma_{2g}$ and $\Sigma_{3g}$.

$^2\Phi_1 >> {}^2\Phi_2 \approx 0$ $^2\underline{I}_{33} > {}^2\underline{I}_{11} - {}^2\underline{I}_{22}, {}^2\underline{I}_{31} - a2x\,{}^3\Phi_2 >> {}^2\underline{I}_{12}, {}^2I_{23} \approx 0$ (15)

Consequently, the dominant parameters are $^2\Phi_1$ and $^2I_{33}$, and the subdominant parameters are $^2I_{11} - {}^2I_{22}$ and $^2I_{31} - a_{2x}{}^3\Phi_2$. Further, by means of a similar estimate, only $^1I_{22}$ participates in the dominant parameters in link-1. The above results are stored in memory 1-5 and the following processing is applied.

As stated above, because of the necessity to achieve static and dynamic balance, almost all industrial robotic manipulators possess a high degree of structural symmetry. Accordingly, if the geometric parameters and approximate shapes of the links are known, it is possible to estimate the parameter orders for all the links, excluding the base axis, by means of the appropriate VSL and simple arithmetic processes. Further, when there is a high degree of asymmetry in the link, the link may be divided into a plurality of VSL and the above method may be applied.

Next, motion planning part 2 will be explained.

As a general rule in parameter identification, it is necessary to satisfy the Persistently Exciting condition for each signal component such as the torque and speed to be measured. It is difficult to fully satisfy this condition, however, this condition would be approximately satisfied by making the manipulator motion as random as possible. However, as a result of the effect of measurement noise, there is no guarantee that all of the parameters will be measured with a high degree of accuracy. Thus, it is not advisable to supplement random motion in order to identify all the parameters, including even the parameters which have the smallest contribution to the joint torque. Further, theoretical investigation shows that some of the parameters, which contribute to the joint torque, may be ignored in the actual control. Alternatively, experiments have shown that some inertial parameters should rather be excluded, due to insufficient measurement accuracy, from the dynamic model parameters at the identification step in order to improve the control capabilities of the manipulator.

Accordingly, in practicality, it is effective to prespecify controlling parameters, such as the dominant parameters discussed above, and plan the motion for obtaining these with a high degree of accuracy. From the estimated results from the structure and VSL of the calculated torque method, the friction of the joint and the dominant parameters of the diagonal terms of the inertial tensor and the first-order moment are obtained as the parameters which chiefly contribute to each joint torque. In an identification, it is important to accurately obtain these controlling parameters. When the dominant parameters based on VSL and the friction parameters are selected as the controlling dynamic parameters, the appropriate manipulator motion mode is determined by candidate motion planner 2—2, and parameter coefficient matrix W is then calculated by coefficient matrix computing part 2—2. A portion of the matrix formed from the coefficients corresponding to the principal parameters is selected and set to W. Then, the following condition number is calculated based on this W in the matrix condition number computing part 2-3. On the presumption that the fewer the condition number, the higher the degree of independence between the parameters, it may be seen that motion such that the number of conditions is below a specified limit is desirable as the motion for parameter identification.

$$\mathrm{Cond}(W) = \sigma_1/\sigma_2 \qquad (16)$$

where, $\sigma_1$: maximum singular value of W
$\sigma_2$: minimum singular value of W Further, an assumption is made that the accuracy of a parameter estimate must be degraded if there are significant imbalances between the parameter coefficients. For this reason, the following equilibrium measure R is calculated by matrix equilibrium measure computing part 2-4. The smaller the value of R, the smaller the imbalance between the parameter coefficients. Therefore, the motion was regarded to be desirable when R was smaller than a predetermined value.

$$R = \max \|w_i\| / \min \|w_i\| \qquad (17)$$

where $\|w_i\|$: row vector normal of W

Lastly, motion for identification of the type considered above is determined by motion selecting part 2-5. In this manner, the motion planning part has prescribed arithmetic functions for forming motion planning which takes into consideration the dominant parameters and friction parameters.

Next, an explanation will be made of driving and measurement part 3.

Driving and measurement part 3 has both functions for driving the manipulator, and for calculating the manipulator driving data. In order to achieve a highly accurate parameter identification, it is necessary to drive the manipulator in accordance with the prescribed motion plan and so as to distinguish the dynamic effects. For this reason, initial parameters are identified from preliminary experiments based on VSL, and the manipulator is driven according to Feed Forward Control which uses the initial parameters as temporary dynamic parameters. More concretely, motion planning is inputted to trajectory planning part 3-1, and the desired trajectory produced here is input to control part 3-2. Control part 3-2 and the manipulator are connected by interface 3-3, comprising a counter, A/D, D/A and the like, power amp 3-4 and current detecting part 3-5. The sampling time during control is 2 msec. Motion data such as joint displacement signals from the optical encoders, the motor driving current and so on are measured (sampling time=2 msec, sampling number=5000). The joint velocities and the joint accelerations were given by smooth numerical differentiation of the displacement data. The torque constant of the motor was determined according to the method of least squares in preliminary tests carried out separately. The above data was stored in memory 3-6.

Lastly, an explanation will be made of the parameter estimating part 4 which estimates the value of the parameters from the data obtained according to the above motion planning for the manipulator and the driving and measurement of the manipulator.

Based on Eq. 11, the procedure for estimating $\chi$ in a discrete system is as follows. First, letting Y and A represent the sampling data and letting $\psi$ represent the error, the following formula is obtained.

$$Y = A\chi + \psi \quad (18)$$

where, $$Y = [\tau(1), \tau(2), \ldots \tau(N)]^T$$

$$A = [W(1), W(2), \ldots W(N)]^T$$

$$\psi = [\Phi(1), \Phi(2), \ldots \Phi(N)]^T \quad (19)$$

The following criterion is introduced here:

$$PI = (Y - A\chi)^T \Omega (Y - A\chi) \quad (20)$$

When $(A^T \Omega A)^{-1}$ exists, the optimum parameter estimate for which PI is a minimum is obtained from the following equation.

$$\chi = (A^T \Omega A)^{-1} A^T \Omega Y \quad (21)$$

Here, $\Omega$ is the weighting matrix. When $\Omega$ is a unit matrix, then $\chi$ becomes the resolution of the least squares.

The above calculations are not practical because a large matrix operation is required when the sampling number increases. Moreover, when identifying temporary base parameters, under certain conditions, $A^T \Omega A$ may not be regular. To avoid these problems in experiments, a sequentially changing arithmetic formula, estimated based on the estimated value at time N-1 and from motion data at initial time N, was employed. The above procedure is carried out by the least squares computing part 4-1, and the results are stored in parameter table 4-2.

Lastly, using the results of actual identification experiments, an explanation will be made of the effects provided by the above structure. The following motion conditions for the manipulator were applied.

(1) The displacement of joint-i was a sinusoidal function with the amplitude $\theta_{i0}$ and the angular frequency $\omega_i$.

(2) All the joints were driven at the same velocity, but, the displacement amplitudes of each joint differed from that of the others.

(3) The joint velocity was changed within a certain range by changing $\omega_i$.

(4) The following three configurations were used for the configuration variations of joint-2 (FIG. 5).
Vertical Configuration (VC)
Neutral Configuration (NC)
Horizontal Configuration (HC)

Further, the following three standard speed conditions were set for the maximum speed of the joint.
LSP: Low Speed Parameter Case: 50 deg/sec
MSP: Medium Speed Parameter Case: 150 deg/sec
HSP: High Speed Parameter Case: 250 deg/sec FIG. 6 shows the motion conditions for the experiment, and FIG. 7 shows amplitude and angular frequency of the motion of the joint at this time.

Next, the results when trajectory control of the manipulator is exercised using identified dominant parameters and friction parameters, and when the effect of the parameters which act on the computed torque is investigated, are shown.

The drive torque is calculated by the following equation using Feed Forward Control based on the parameters identified in the manipulator.

$$\tau_l = \tau(\ddot{q}_d, \dot{q}_d, q_d) + K_v(\dot{q}_d - \dot{q}) + K_p(q_d - Q) \quad (22)$$

where $q_d$ is the desired trajectory of the joint displacement, and the $K_v$ and $K_p$ are respectively the velocity and the position feedback gains. The control sampling time was 2 msec.

Figure 8:
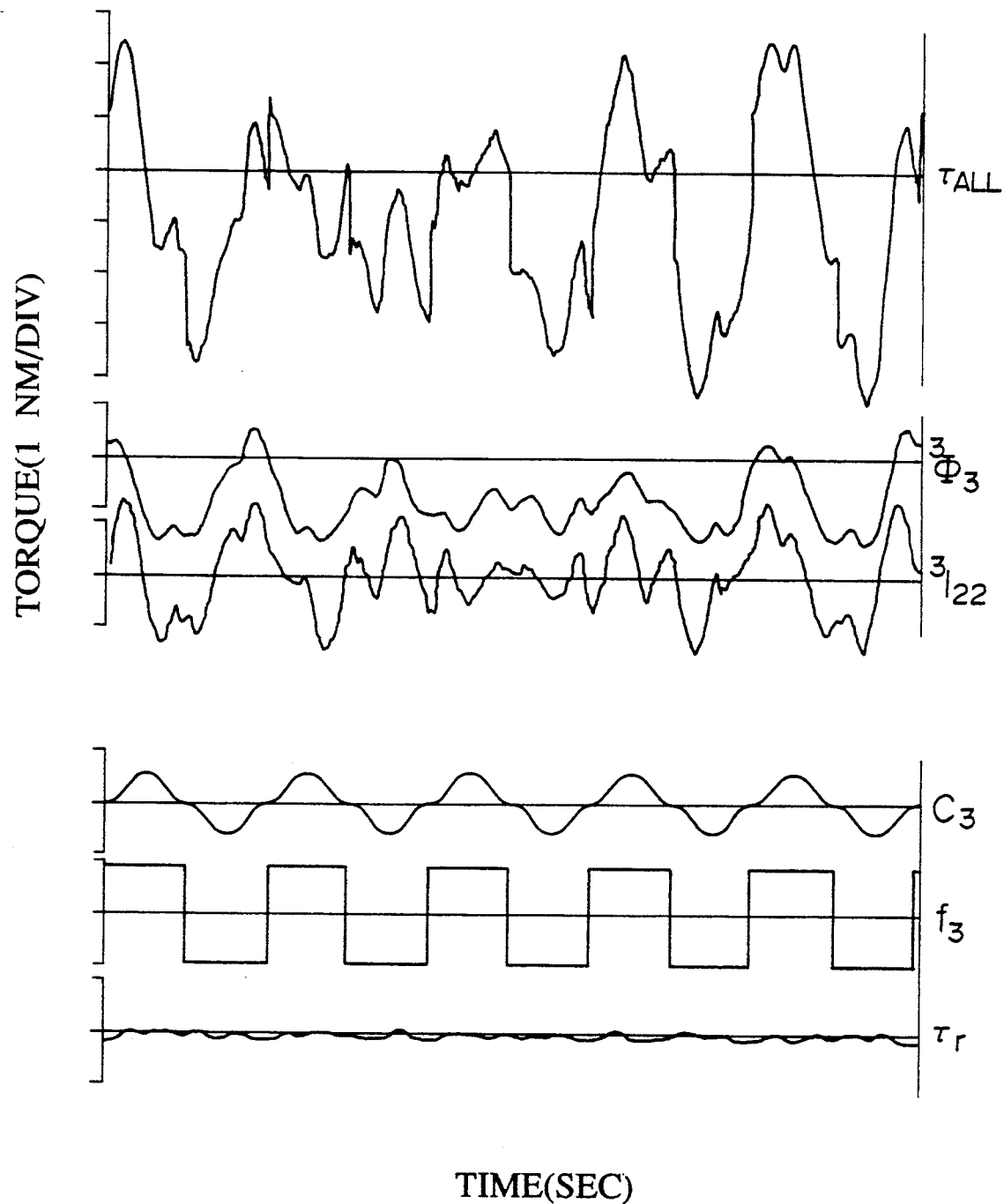
FIG. 8 is a diagram showing an example of the computed torque of the joint.

FIG. 8 shows the drive torque of joint-3 at time of identification computed by using the identified parameters. According to this figure, the parameters mainly contributing to the total joint torque $\tau_{all}$ are the dominant parameters $^3\Phi_3$ and $^3I_{22}$, the friction parameters $c_3$ and $f_3$. The rest of the torque $\tau$ contributed by the other parameters is exceedingly small as compared to the total of the above contributing torque of the parameters. This result shows that parameter classification using VSL is appropriate for practical application. In conventional devices there are 9 parameters (7 base parameters and 2 friction parameters) which contribute to the drive torque of joint-3, however, the above results show that it is possible to decrease the number of parameters used in actual control to approximately half.

According to test calculations by a motion planning part implemented in a computer, the Cond(w) and R of the motion in the experiment shown are as follows.

$$Cond(W)_{NC} < Cond(W)_{UC} < Cond(W)_{HC}$$

$$R_{MSP} < R_{HSP} < R_{LSP}$$

Accordingly, NC and MSP motions are inferred as the most desirable motion for identification. Experimental results which prove this follow below.

FIG. 9 shows the means square errors $e_i$ (i=1,2,3) of the torque computed by using the desired torque trajectories for joint-1 through joint-3. Here, the manipulator was driven using the identity values obtained under the three standard conditions stated above for the NC mode, and the error with respect to the three motion conditions including the speed at time of identification was calculated according to equation (23) below.

$$e_i = \frac{1}{N} \sqrt{\left( \sum_{j=1}^{N} (\tau_m(j) - \tau_s(j))^2 \right)} \quad (23)$$

where
N: sampling number
$\tau_m(j)$: measured torque
$\tau_s(j)$: calculated torque The arrow in the figure indicates the standard speed at time of identification, and at this point the standard speed and the motion speed are identical. A comparison of LSP, MSP, and HSP reveals that the error is smallest when motion is operated under the same conditions as those employed in identification. This agrees with the indication conventionally known that motions that resemble the required motions in manipulation tasks are the most desirable for parameter identification. However, it should be noted that in the case of the MSP, the errors tend to be small under other velocity conditions.

In the same manner, FIG. 10 shows the errors of the computed torque from the desired torque trajectories in VC and HC using the parameters identified with angular speed conditions MSP and NC. Overall, the errors were small, and it was possible to reproduce a drive torque with a high degree of accuracy. Accordingly, this shows that, from the point of view of controlling torque computational errors within the moveable space of the manipulator, this is one desirable motion mode for identification. These results show that the motion planning according to the present invention is an appropriate method of parameter identification.

In this manner, the present invention provides a means by which the parameters which act on the controlling effect of control capacity are classified in a simple order, and moreover, where appropriate motion for parameter identification is clear. As a result, the dynamic parameters of the manipulator can be identified with a high degree of accuracy.

What is claimed is:

1. A dynamic model parameter identification system for manipulators having links and a joint, said system comprising:
   parameter classifying means for classifying a plurality of parameters, said parameter classifying means approximates said links by means of symmetrical and homogeneous virtual solid links, calculates the inertial parameters of said manipulator, and classifies the calculated inertial parameters into groups according to influence on control of said manipulator;
   motion planning means for determining motions of said manipulator, said motion planning means calculates the condition number for parameter coefficient sub-matrix formed by terms corresponding to the parameters under consideration, calculates the number of equilibriums from the quotient of the maximum and minimum values of the vector normal of the rows of said coefficient sub-matrix, and determines the motion for parameter identification so that said condition number and said number of equilibriums are both below predetermined values;
   driving means for driving said manipulator according to said motion planned by said motion planning means;
   motion measuring means for measuring motion of said manipulator and driving force applied to said manipulator; and
   parameter estimating means for estimating parameters based on a linear equation consisting of unknown vectors, drive torque vectors and parameter coefficient matrix consisting of motion measurement.

2. A dynamic model parameter identification system according to claim 1 wherein said inertial parameters of said manipulator are calculated from inertial matrix components of each said virtual solid link and from relative configuration of said links.

3. A dynamic model parameter identification system according to claim 1 wherein inertial parameters having dominant effects on said torque are used to form said parameter coefficient sub-matrix.

4. A dynamic model parameter identification system according to claim 3 wherein said dominant parameters are diagonal terms of first order moment and inertial tensor matrix.

5. A dynamic model parameter identification system according to claim 4 wherein said parameter coefficient sub-matrix is formed by said dominant parameters and friction coefficients of joints.

6. A dynamic model parameter identification system for manipulators having links and a joint, said system comprising:
   parameter classifying means for classifying a plurality of parameters, said parameter classifying means approximates said links by means of symmetrical and homogeneous virtual solid links, calculates the inertial parameters of said manipulator, and classifies the calculated inertial parameters into groups according to influence on control of said manipulator;
   motion planning means for determining motions of said manipulator, said motion planning means calculates the condition number for parameter coefficient sub-matrix formed by terms corresponding to the parameters under consideration, calculates the number of equilibriums from the quotient of the maximum and minimum values of the vector normal of the rows of said coefficient sub-matrix, and determines the motion for parameter identification so that said condition number and said number of equilibriums are both below predetermined values;
   driving means for driving said manipulator according to said motion planned by said motion planning means;
   motion measuring means for measuring motion of said manipulator and driving force applied to said manipulator; and
   parameter estimating means for estimating parameters based on a linear equation consisting of unknown vectors, drive torque vectors and parameter coefficient matrix consisting of motion measurement, wherein
   said inertial parameters of said manipulator are calculated from inertial matrix components of each said virtual solid link and from relative configuration of said links, and inertial parameters having dominant effects on said torque are used to form said parameter coefficient sub-matrix,
   said parameter coefficient sub-matrix is formed by said dominant parameters and friction coefficients of joints.

7. A dynamic model parameter identification system according to either one of claims 1 or 2, wherein said driving means is a high geared electric motor.

8. A dynamic model parameter identification system according to either one of claims 1 or 2, wherein said manipulators are robotic manipulators for industrial use.

* * * * *